United States Patent [19]
Downing

[11] 3,867,044
[45] Feb. 18, 1975

[54] SECONDARY SAFETY DEVICE AND JOINT
[75] Inventor: James W. Downing, Buena Park, Calif.
[73] Assignee: McDonnell Douglas Corporation, Santa Monica, Calif.
[22] Filed: Aug. 6, 1973
[21] Appl. No.: 386,090

[52] U.S. Cl.................. 403/155, 403/317, 85/5 N, 24/201 LP, 280/515
[51] Int. Cl. ........................................... F16c 11/00
[58] Field of Search .......... 403/154, 155, 157, 158, 403/150, 151, 320, 316, 317, 318, 21, 378; 85/5 N, 5 CP, 8.1, 8.3; 151/5, 26; 24/201 LP, 201 SL; 280/515

[56] References Cited
UNITED STATES PATENTS
| 213,912 | 4/1879 | Love | 403/156 |
| 2,275,162 | 3/1942 | Sutthoff | 403/152 X |
| 2,672,848 | 3/1954 | Brill | 403/21 |

FOREIGN PATENTS OR APPLICATIONS
| 812,032 | 8/1951 | Germany | 280/515 |

Primary Examiner—Andrew V. Kundrat
Attorney, Agent, or Firm—George W. Finch; Walter J. Jason; Donald L. Royer

[57] ABSTRACT

A safety device for a joint comprised of a spring wire member retained off-center from but in contact with the head of a bolt or pin which needs to be retained in its associated hole no matter what happens to the primary retention means thereof.

2 Claims, 3 Drawing Figures

PATENTED FEB 18 1975
3,867,044
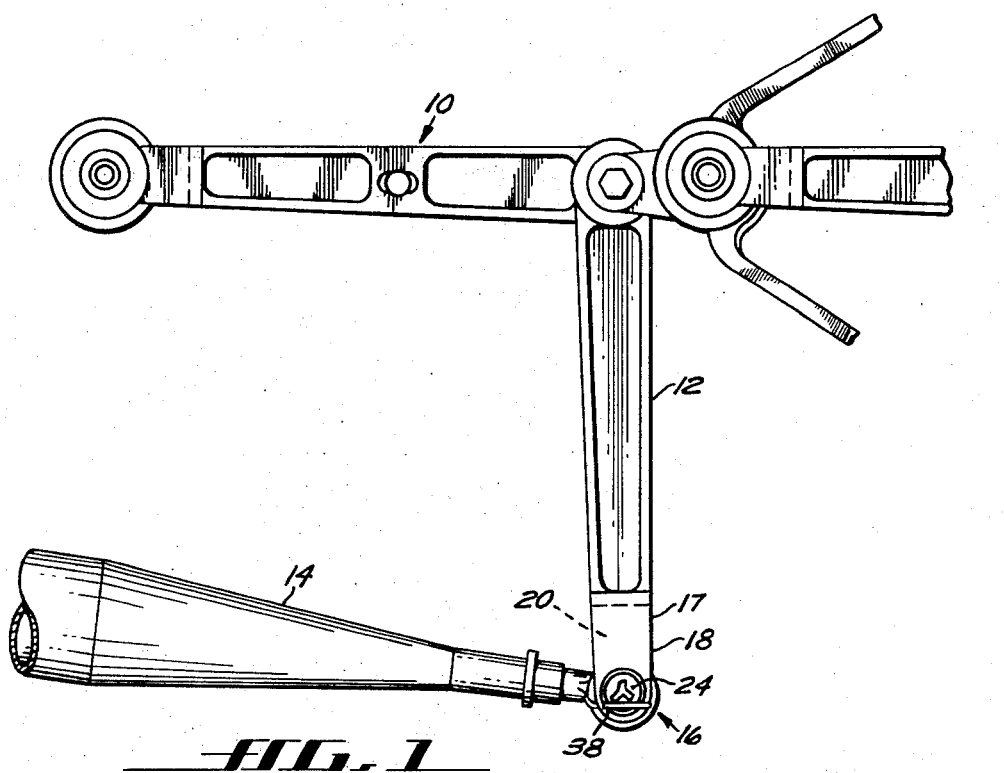
FIG. 1
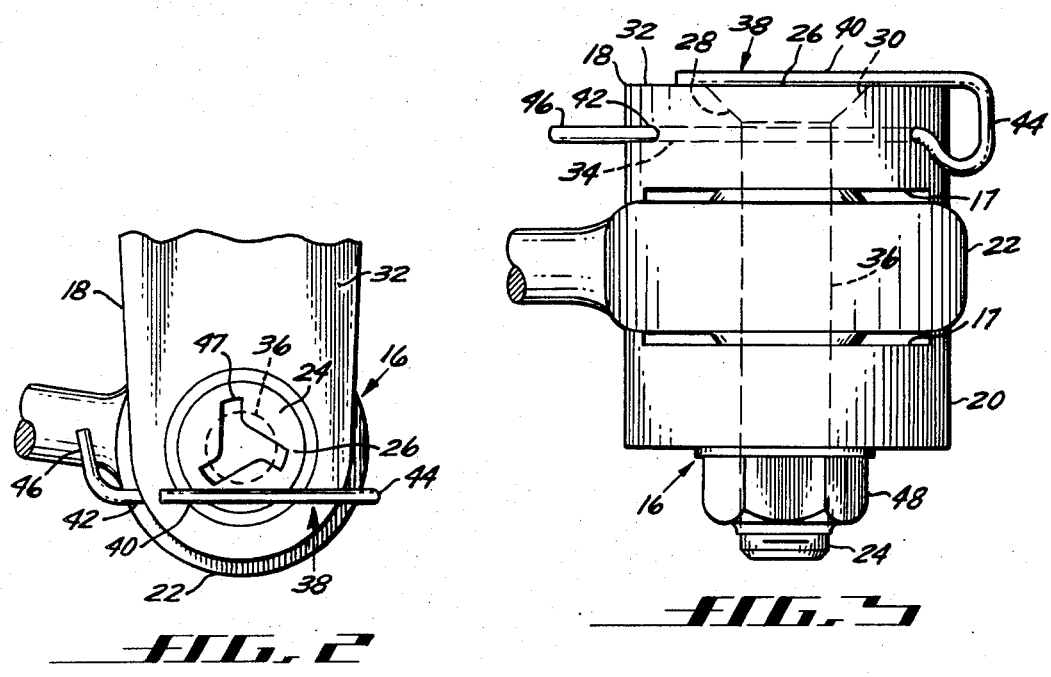
FIG. 2
FIG. 3

SECONDARY SAFETY DEVICE AND JOINT

BACKGROUND OF THE INVENTION

There are various applications in which bolts or pins are used to connect two or more members where due to critical relationships therebetween, disconnection can cause catastrophic failure. One such instance is in the control system of modern aircraft where links and rods are tied together by bolts. The bolts usually have primary retention means such as self-locking nuts on the ends thereof to retain the bolts in their desired positions. Because of the critical nature of the bolts, various secondary systems such as cotter pins, spring nut clips, lock washers and other similar devices have been employed to assure that the bolt cannot fall out to disconnect the structure except when it is required for maintenance, repair or other purposes. These prior art devices either lack the reliability desired or are expensive, difficult to install or restrict the ease with which the original assembly can be constructed, thereby raising the production cost of the aircraft.

SUMMARY OF THE INVENTION

The present secondary safety device prevents disengagement of a bolt or pin from the control linkage joint. The safety device usually is fabricated from spring steel wire. One end of the safety device is inserted through a hole in the member of the control linkage joint adjacent the portion thereof through which the bolt or retaining pin passes. The opposite end of the safety device is shaped so it rests on the top portion of a flush bolt or retaining pin head to prevent longitudinal movement of said bolt or pin relative to the joint structure. Upon insertion through the hole, the first end of the safety device is usually bent like a cotter pin to retain it in the member.

The safety device does not have to be removed from the joint structure in order to remove the bolt or pin therefrom. By merely laterally moving the portion of the safety device which bears against the head away from the head, the bolt or pin is free to be removed. Installation is accomplished in a similar manner. In the case of a flush head bolt, the conical underside of the flush head acts like a wedge to move the safety device away from its retaining position as the bolt is inserted into its hole. As the bolt reaches its seated position, the safety device springs back to engage the upper portion of the bolt head.

It is therefore an object of the present invention to provide a safety device which is simple to install and use while being reliable enough to assure that no catastrophic failure is ever possible.

Another object is to provide a bolt safety which is economical to manufacture and install.

Another object is to provide a safety device which does not needlessly complicate the installation of bolts or pins which are to be safetied.

Another object is to provide a bolt or pin safety device which need not be removed for removal or installation of the bolt or pin.

Another object is to provide a safety device whose proper installation and operation is obvious visually.

These and other objects and advantages of the present invention will become apparent after considering the following detailed specification which covers a preferred embodiment thereof in conjunction with the accompanying drawing wherein:

BRIEF DESCRIPTION OF THE DRAWING

FIG. 1 is a partial, elevational view of a control system having a joint employing the safety device of the present invention;

FIG. 2 is an enlarged portion of FIG. 1 showing the safety device of the present invention installed in a joint; and FIG. 3 is a side view of the bolted joint of FIGS. 1 and 2 with the safety device installed.

DESCRIPTION OF THE PRESENT EMBODIMENT

Referring to the drawing more particularly by reference numbers, number 10 in FIG. 1 refers to a portion of an aircraft control system wherein a lever 12 is connected to a rod 14 by means of a bolted connection 16 which is shown in greater detail in FIGS. 2 and 3. The lever 12 includes a bifurcated end portion 17 having arms 18 and 20. The rod 14 is comprised of a journaled fitting 22 which fits between the arms 18 and 20 and is retained thereto by means such as bolt 24 which passes through both of the arms, 18 and 20, and the journaled fitting 22.

The bolt 24 has a flush head 26 with a conical undersurface 28 which fits in a countersink 30 in arm 18 so that the surface of the bolt head 26 is in alignment with the surrounding surface 32 of the arm 18.

The arm 18 also includes a transverse hole 34 which is generally parallel to the surface 32 and perpendicular to the bolt 24. The hole 34 is also positioned so that the bolt head 26 overhangs it yet the hole 34 is spaced from the shank 36 of the bolt 24.

The safety device 38 is usually constructed from spring wire and it has parallel end portions 40 and 42 with a coil portion 44 therebetween. The end portion 42 of the safety device 38 is preferably longer than the end portion 40 so that when the portion 42 is inserted through the hole 34 until the coil portion 44 contacts the arm 18, a substantial portion thereof extends past the arm 18. At this point in the installation, the portion of the end portion 42 which extends through and beyond the hole 34 is bent to form a retaining hook 46. The retaining hook 46 locks the safety device 38 to the arm 18 so the end portion 40 is retained in a position overlaying the bolt head 26 to assure that the bolt 24 remains to provide the connection 16. It should be noted that due to the spring characteristic of the device 38 and its off-center location, it does not block the torquing means for the bolt 24, shown in FIG. 2 as a Tri-wing socket 47.

When it is desired to remove the bolt 24 from the bolted connection 16, the upper end portion 40 of the safety device 38 is merely sprung laterally back from over the head 26 of the bolt allowing the bolt 24 to be removed. When the bolt 24 is replaced, the safety device 38 does not interfere until the upper portion 40 thereof comes in contact with the conical undersurface 28 of the bolt head 26. The conical undersurface 28 wedges the end portion 40 out of the way as the bolt 24 is being installed in the connection 16 until the surface of the flush head 26 becomes flush with the surface 32. At that time, the end portion 40 snaps back over the bolt head 26 assuring that the bolt 24 will remain within the connection 16 even if the nut 48 which normally retains the bolt to the connection 16 somehow becomes detached from the bolt 24. It should be realized that a flush head pin can be safetied in the same manner.

Since the safety device 38 is highly visible when the bolted connection 16 is complete, it provides a fast visual check to assure flight line mechanics that it is in operation and that no catastrophic failure of the control system is possible due to the disconnection of the bolted joint 16.

Therefore there has been shown and described a novel secondary safety device which fulfills all of the objects and advantages sought therefor. Many changes, modifications, variations, and other uses and applications of the subject invention will, however, become apparent to those skilled in the art after considering this specification and the accompanying drawing. All such changes, modifications, variations, other uses and applications which do not depart from the spirit and scope of the invention are deemed to be covered by the invention which is limited only by the claims with follow.

What is claimed is:

1. A safetied joint, the joint including a flush head connector which is retained in a member defining a countersunk hole therein, said member having a surface from which said countersunk hole extends, the improvement comprising:

an inner surface of said member defining a safety hole therethrough parallel to said member surface and spaced from said countersunk hole; and a safety member constructed from spring wire, said safety member having an end portion, a first portion at an angle to said end portion which is retained in said safety hole by said end portion, a second portion which engages said flush head of said bolt and said member adjacent said countersink and a central coil portion between said first and second portions, said first and second portions being parallel and defining a plane therebetween, and a portion of the flush head of said connector intersecting the plane defined between said first and second portions of said safety member.

2. The joint defined in claim 1 wherein said central coil portion includes a subportion adjacent said first portion which extends away from said second portion.

* * * * *